April 26, 1932.  J. P. JOHNSON  1,855,679
TRANSMISSION GEARING
Filed Aug. 22, 1927   3 Sheets-Sheet 2

Inventor
James P. Johnson
Kevis Hudson Kent
Attorney

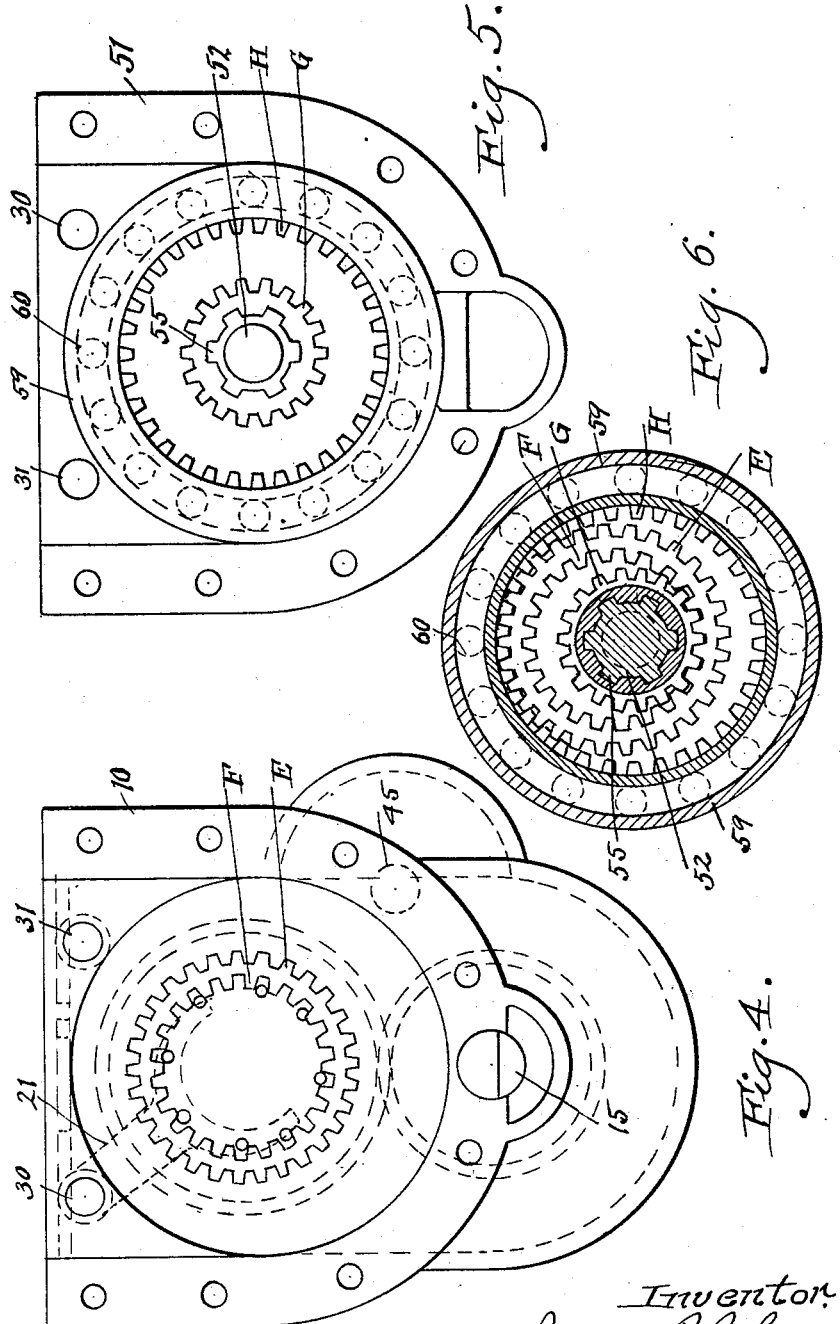

Patented Apr. 26, 1932

1,855,679

UNITED STATES PATENT OFFICE

JAMES P. JOHNSON, OF CLEVELAND, OHIO, ASSIGNOR TO THE J. P. JOHNSON ENGINEERING COMPANY, OF CLEVELAND, OHIO, A CORPORATION OF OHIO

TRANSMISSION GEARING

Application filed August 22, 1927. Serial No. 214,477.

This invention relates to gearing and more particularly to a four-speed transmission for motor vehicles and the like, embodying two quiet high speeds.

It is one of the objects of the present invention to construct a unit which is inexpensive to manufacture, as compared with the standard type three-speed transmissions now employed, which is light in weight, and by the employment and arrangement of internal and external meshing gears is much more quiet and operates much more efficiently than the present type of three-speed transmissions.

It is a further object of the invention to provide a transmission of the type referred to, having two suitable quiet high speeds, one of which is adaptable for high-speed driving over substantially level country, and the other high speed adaptable for quiet and relatively fast driving through mountainous country, or in city traffic where power and quick acceleration are desirable.

A further object of the invention is to provide a transmission comprising substantially two complete gearing units, each having high and low speed ratios and so connecting these gearings units together that the high and low gear ratios of one unit can be combined with the high and low gear ratios of the other unit to obtain four suitable speeds adaptable to various kinds of driving conditions.

It is another object of the invention to employ an axle having the present axle ratio which is considered the most efficient for all purposes and providing two quiet high speeds in which the ratio of one high speed will be slightly less than the rear axle ratio and the other of which will be slightly greater than the rear axle ratio.

It is a further object of the invention to provide a transmission mechanism of the type referred to in which the engine speed is materially reduced at extremely high speeds which thereby results in added length of life to the engine and economical running conditions, as well as substantially eliminating vibration at high speeds.

It is another object of the invention to provide a second quiet high speed which has a slightly higher ratio than the rear axle ratio for the purpose of adapting the vehicle to efficient operation in city traffic where more power and acceleration is needed, but at the same time securing such advantages with a quiet gear arrangement.

It is a further object of the invention to provide a shifting mechanism in connection with the four-speed transmission which is exceptionally simple to operate and, one in which the shifting from one high speed to the other is made simple and efficient.

With the objects above indicated, and other objects hereinafter explained in view, my invention consists in the construction and combination of elements hereinafter described and claimed.

Referring to the drawings,

Fig. 4 is an end view looking in on the division line of the housing.

Fig. 5 is an end view looking in on the division line of the auxiliary housing.

Fig. 6 is a vertical cross sectional view taken on line 6—6 of Fig. 1 and showing the arrangement of the internal and external meshing gears, and Fig. 7 shows a diagrammatic shifting arrangement.

Figure 1:
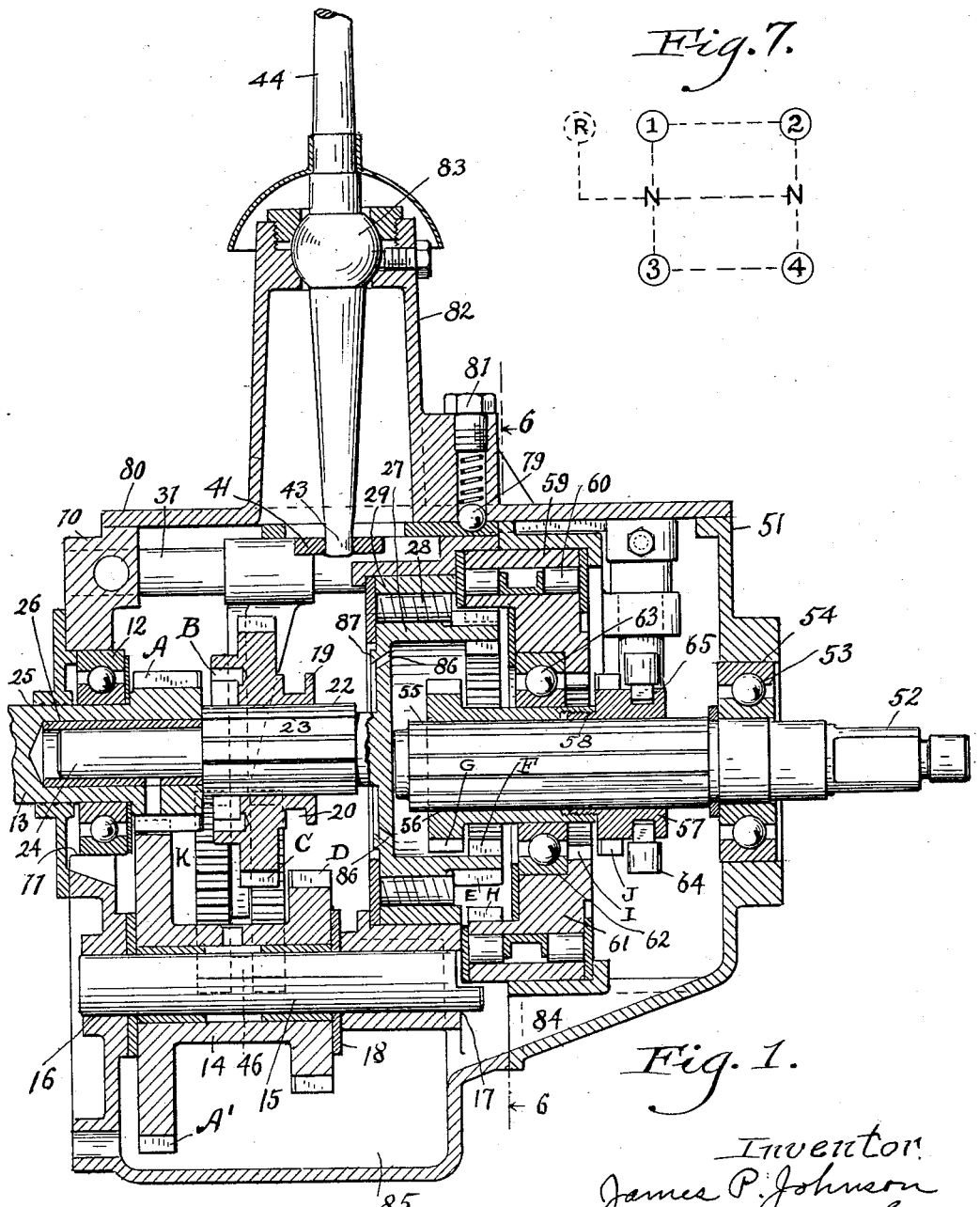
Fig. 1 is a vertical cross sectional view of the transmission mechanism embodying my present invention.

In the drawings, 10 represents a transmission housing which is adapted to enclose the transmission gearing about to be described. The forward end of the housing is provided with an opening 11 within which the bearing 12 is supported, which latter rotatably receives the drive shaft 13 connected by suitable mechanism with the engine of the motor vehicle.

The rear end of the shaft 13 is provided with an external gear A having a suitable number of teeth and which is constantly in mesh with an external gear A' formed upon a hub 14 which is freely mounted upon a longitudinally extending pin or rod 15. The outer ends of the pin or rod 15 are suitably journaled as at 16 and 17 in portions of the housing 10, and interposed between the portions of the housing 10 and the hub 14 are washers 18 encircling the pin 15 adapted to function as end thrust washers for positioning the gears A' and D. The hub 14 has also at its rear portion an external gear D having a suitable number of teeth, and which gear is adapted to be engaged by an external gear C having a suitable number of teeth, provided upon a shiftable sleeve 19. The sleeve 19 has a circumferentially extending groove 20 within which extends a shifting fork 21 for moving the gear C on the sleeve 19 into and out of engagement with the external gear D on the hub 14. This sleeve is also provided with an internal clutch B having teeth corresponding substantially in shape and number to the teeth on the external gear A on the drive shaft and which clutch B is adapted to be moved by the shifting fork 21 into and out of engagement with an extended portion of the external gear A on the drive shaft 13. The sleeve 19 is slidably mounted upon an intermediate shaft 22 and is prevented from independent rotation therewith by co-operating splines 23.

The forward end 24 of the intermediate shaft 22 is of reduced diameter and, in the present instance, is rotatably received within a bushing 25 secured in a central bore 26 in the inner end of the drive shaft 13. The rear end of the intermediate shaft 22 beyond the splines 23 is provided with an enlarged cylindrical extension 27 having upon its inner surface an internal gear F having a suitable number of teeth, and an external gear E having a suitable number of teeth, which gears E and F are preferably in vertical alignment and concentric with the axis of the intermediate shaft 22 and the axis of the drive shaft 13. This cylindrical extension 27 is rotatably supported in roller bearings 28 which, in turn, engage with a bearing ring 29 secured within the housing 10.

In the upper portion of the housing 10 are a pair of shifting rods 30 and 31 which extend longitudinally of the transmission and which are adapted to be moved longitudinally in making the proper selection of gears. The shifting rod 30 has securely pinned thereto, as at 32, a shifting fork 21 which is adapted, when moved forwardly, to move the clutch B into engagement with the external gear A of the drive shaft 13, and when moved rearwardly to move the external gear C into mesh with the external gear D to obtain the desired speed ratios between the drive shaft 13 and the intermediate shaft 22.

This shifting rod 30 is locked in each of the gear-engaging positions in the customary manner which embodys a detent 33 engaging with the forward notch 34 or the rearward notch 35 depending upon the position to which the shifting rod 30 has been moved. The shifting rod 30, and consequently the external gear A and clutch B and the external gears C and D, is held in neutral position by engagement between the detent 33 and the neutral notch 36. This detent 33 is held in engagement with the various notches by means of a spring 37 interposed between the detent 33 and the detent 38 associated with the shifting rod 31. The shifting rod 31 has a neutral notch 39 and at the forward end a notch 40 which locks the gears in reverse, the operation of which will be hereinafter more fully explained.

The shifting fork 21 is provided at its upper end adjacent the shifting rod 30 with a substantially horizontal inward extension 41 having a recess 42 which is adapted to receive therein the lower end 43 of the shifting lever 44. It will, therefore, be seen that by moving the shifting lever 44 either forward or rearward, the shifting rod 30 is caused to move in the reverse direction, thereby causing the slidable sleeve 19 carried by the intermediate shaft 22 to be moved forwardly or rearwardly into engagement with either the external gear A on the drive shaft 13 or into engagement with the external gear D on the pin or rod 15.

Figure 2:
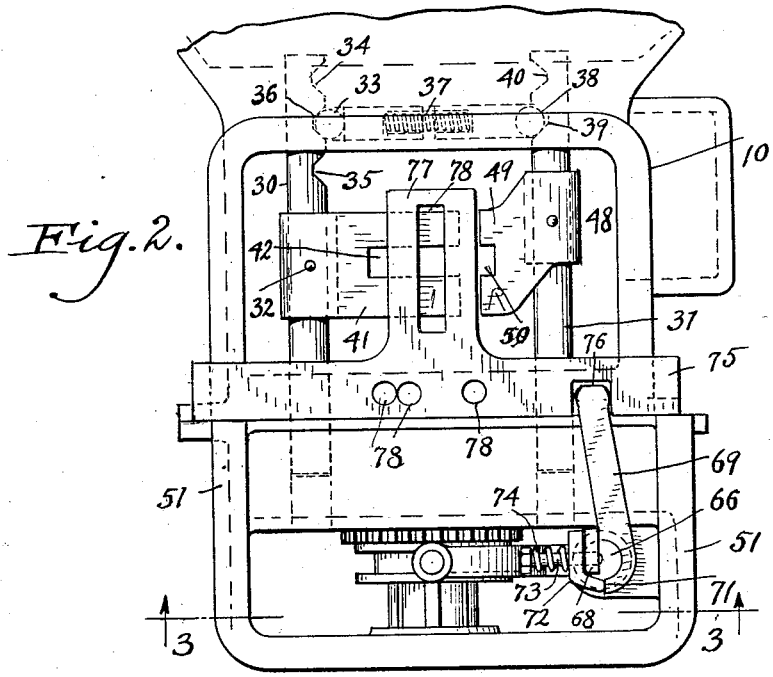
Fig. 2 is a top plan view of the transmission mechanism with the cover plate removed and showing the shifting arrangement.
Figure 3:
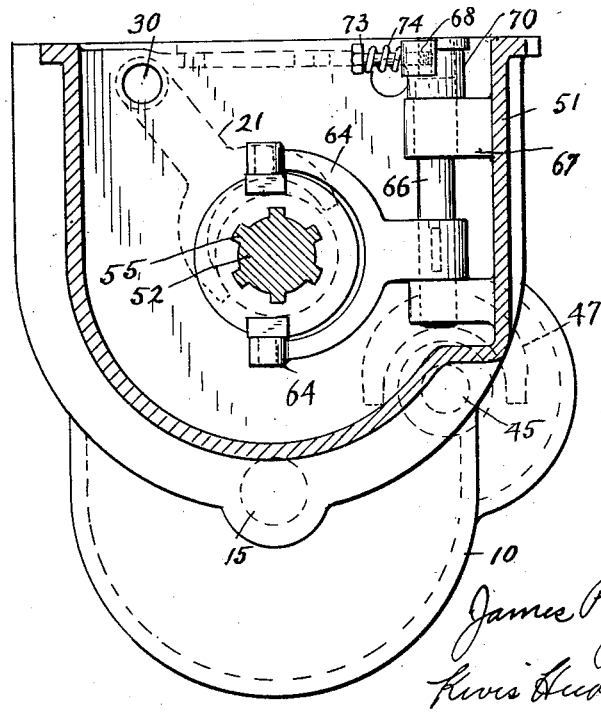
Fig. 3 is a vertical sectional view taken on line 3—3, of Fig. 2.

The reversing gear is also contained in the housing 10 and comprises an external gear K which is slidably and rotatably supported by a longitudinal extending pin or rod 45 supported conveniently in the lower portion of the housing 10, as clearly shown in Fig. 3. This external gear K is so mounted that it is constantly in mesh with the gear C on the slidable sleeve 19 mounted on the intermediate shaft 22. When the reverse gearing is not being used this external gear K is constantly rotating due to its engagement with the external gear C, but it offers practically no resistance to the free movement of the gear C. The external gear K is provided with a circumferentially extending groove 46 within which is positioned a shifting fork 47 for moving the external gear K along the shaft 45 and into engagement with the external gear D mounted upon the pin or rod 15. This shifting fork 47 is secured to the shifting rod 31, as indicated at 48, and is further provided with a horizontal extension 49 which extends inwardly and has a recess 50 in substantial alignment with the recess 42 in the extension 41 when the shifting rods 30 and 31 are in neutral position, as indicated in Fig. 2. It will, therefore, be seen that to shift into reverse position it is necessary to throw the lower end 43 of the shifting lever 44 into engagement with the recess 50 of the extension 49 and then move the shifting rod 31 rearwardly until the detent 38 engages the reverse notch 40 in the end of the rod.

The description thus far explains the arrangement of the gears and their associated mechanism in the forward portion of the housing 10 and it should be understood that this is the preferable construction inasmuch as these two speeds, so far described, can be constructed and housed as a complete unit in themselves, which materially aids in the manufacture of this transmission mechanism. Furthermore, it provides a construction in which the mechanism is readily accessible in case it is necessary to inspect or repair the same, and which does not consume any more space and involves only little more weight than the three-speed transmissions now employed in connection with motor vehicles.

At the rear portion of this housing 10 I provide what might be termed an auxiliary housing 51 which is merely a continuation of the main housing 10 and which housing encloses another arrangement of gears comprising a detachable unit. This arrangement is naturally preferable and provides, as a result thereof, an exceptionally simple manner of assembling the transmission mechanism.

A driven shaft 52 is rotatably supported by a bearing 53, which, in turn, is secured within an opening 54 provided in the end of the auxiliary housing 51. This driven shaft 52 has its axis of rotation positioned eccentric or off center with respect to the axis of rotation of both the intermediate shaft 22 and the drive shaft 13 and is connected by suitable mechanism to the rear axle and transmits the power from the engine of the motor vehicle through the transmission to the rear axle. The inner end of the driven shaft 52 is provided with a plurality of splines 55 adapted to engage with cooperating splines provided upon the inner surface of a sleeve 56 slidably mounted upon the inner end of the driven shaft. This sleeve 56 is connected to a sleeve 57 slidably but non-rotatably mounted on the inner end of the driven shaft 52, by screw threads 58. Due to the fact that the splines 55 on the driven shaft 52 engage with the cooperating splines upon the sleeves 56 and 57, there is no stress set up in the screw threads 58 aside from that caused by merely sliding the sleeves 56 and 57 longitudinally along the driven shaft 52. A cylindrical ring 59 is securely fitted within the forward portion of the auxiliary housing 51 and acts as a bearing surface for a plurality of roller bearings 60 which, in turn, rotatably support a cylindrical member 61. This cylindrical member 61 is provided upon its inner forward surface with an internal gear H having a suitable number of teeth, and when in assembled position is adapted to constantly mesh with the external gear E on the cylindrical extension 27 secured to the intermediate shaft 22.

The cylindrical member 61 is provided with a counterbore 62 which receives therein the bearing 63, the inner race of the bearing being supported upon the sleeve 56 for suitably supporting the inner end of the driven shaft 52. Adjacent the counterbore 62 in the cylindrical member 61 and upon the opposite end of the gear H is a plurality of internal teeth I which may be in the shape of ordinary gear teeth or may merely be inward projections adapted to engage with the external teeth or projections J formed upon the outer surface of the sleeve 57, thus functioning as a clutch. These teeth or projections J are adapted to be moved into engagement with the internal teeth or projections I in driving through one of the sets of gears to obtain the desired speed ratio and in moving the sleeve 57 in the opposite direction in which the teeth I and J are in disengaged position, the external gear G, having a suitable number of teeth, provided upon the inner end of the sleeve 56 is moved into meshing engagement with the internal gear F of the cylindrical extension 27 carried by the intermediate shaft 22.

To move the sleeves 56 and 57 longitudinally along the driven shaft 52, I employ a shifting fork 64 which is positioned with a circumferentially extending groove 65 provided in the face of the sleeve 57 and outwardly beyond the teeth or projections J. The shifting fork is secured to a vertically extending pivoted pin or rod 66 mounted in lugs or extensions 67 formed integrally with a portion of the auxiliary housing 51, as clearly shown in Fig. 3. The upper portion of the pin has a rectangular extension 68 extending above the upper lug 67 but below the top surface of the auxiliary housing 51. This pin 66 carrying the shifting fork 64 is oscillated about its axis by a horizontally positioned pivoted lever 69 which has a hub portion 70 adapted to loosely fit the upper end of the pin 66. The pivoted lever 69 is provided with an abutment 71 and is continually engaged by a finger 72 supported by a bolt 73 extending through a suitable opening in the finger 72 and screwed into the rectangular extension 68 on the pin 66, as clearly shown in Fig. 2.

Disposed between the head of the bolt 73 and the finger 72 encircling the bolt is a spring 74 for normally holding the finger 72 against the abutment 71 of the pivoted lever 69. By moving the outer end of the pivoted lever 69 in either direction the pin 66 is thereby caused to oscillate about its axis and the shifting fork 64 is moved inwardly or outwardly depending upon the direction of movement of the pivoted lever 69, the tension of the spring 74 being sufficient to overcome independent movement of the pivoted lever 69 about the pin 66. However, when this lever has been moved to the right, as viewed from Fig. 2, its normal distance, additional movement of the pivoted lever 69 to the right is permitted without transmitting such movement to the shifting fork 64, and for a purpose which will later be described.

As a means for moving the pivoted lever 69 in either direction, I employ a T-member 75 which is slidably mounted in the top surface of the housing 10 and adjacent the auxiliary housing 51. This T-member is provided with a recess 76 near one end which receives therein the free end of the pivoted lever 69. The upright portion 77 of the T-member 75 is provided with a slot 78 which extends transversely across the recesses 42 and 50 of the shifting forks 21 and 47. The slot 78 in the T-member 75 is adapted to receive the lower end 43 of the shifting lever 44 and movement of this shifting lever in certain directions causes movement of the T-member 75 in the opposite direction, that is when the shifting lever 44 is moved in one direction to the right in Fig. 2 the T-member 75 is shifted to the left, as viewed from Fig. 2, which causes the shifting fork 64 to be swung outwardly thereby moving the external gear G into meshing engagement with the internal gear F upon the intermediate shaft 22. Movement of the T-member 75 in the opposite direction or to the right, as viewed from Fig. 2, causes the shifting fork 64 to be moved inwardly in which case the external teeth or projections J on the sleeve 57 are caused to mesh with the internal teeth or projections I upon the cylindrical member 61.

The top surface of the T-member 75 is provided with a plurality of recesses 78 which indicate the various positions of the meshing gears and are adapted to be engaged by a spring-pressed detent 79 located in the cover plate 80. The tension of the detent 79 upon the T-member 75 is regulated by a screw 81 which may be turned in one direction to increase the tension of the detent upon the T-member 75, or in the opposite direction to decrease the tension. When the T-member 75 is moved in one direction, one of the recesses 78 is engaged by the detent 79 and prevented from accidental movement thereby preventing accidental disengagement of the meshing gears, and when the T-member 75 is moved in the opposite direction it is also locked by the engagement of the detent 79 with one of the recesses 78 and likewise prevents disengagement of the other meshing gears.

The cover plate 80 is provided with a tubular extension 82 which pivotally secures the ball joint 83 of the shifting lever 44.

It will, therefore, be seen that enclosed in this auxiliary housing 51 is also a complete gearing unit having two speeds which I will term high and low speed. These speeds are selected by movement of the sleeves 56, 57 in one direction in which the external teeth or projections J are moved into meshing engagement with the internal teeth or projections I, and when the sleeve 56, 57 is moved into the opposite direction the external teeth G mesh with the internal teeth F upon the intermediate shaft 22.

From the foregoing description it will be seen that there are, therefore, two complete units, a high and low gear unit in the housing 10, and a high and low gear unit in the auxiliary housing 51 with shifting means for selectively combining the gear unit to obtain the desired speed ratio.

It will further be seen that I have combined these two gear units so that it is possible, with certain shifting means, to get a combination of the high and low speeds in each of these gear units, which enables me to obtain my four-speed transmission consisting of two quiet high speeds, the quietness of which is due to the employment of internally and externally meshing gears.

In Fig. 7 I have shown the gear shift as worked out for this specific structure but it should be understood that I am not to be limited to this specific arrangement and manner in which the gears are shifted inasmuch as there are any number of shifting arrangements which can be worked out with satisfaction.

The drive through first gear or the customary low is obtained, assuming that the shifting lever 44 is in neutral position, by moving the lever to the left and subsequently forward. As a result of the movement of the shifting lever to the left the T-member 75 has been moved to the right which causes the shifting fork 64 to be moved inwardly thus sliding the sleeve 57 along the driven shaft 52 until the external teeth or projections J are in mesh with the internal teeth or projections I upon the cylindrical member 59. The movement of the shifting lever forward causes the shifting rod 30 to be moved rearwardly until the detent is in engagement with the notch 34. The movement of this shifting rod 30 to the rear carries with it the shifting fork 21 and causes the sleeve 19 to slide along the intermediate shaft 22 until the external gear C has been moved into mesh with the external gear D on the sleeve 14 upon which same sleeve the external gear A' is provided. The drive, therefore, through the low gear is from the drive shaft 13 through the external gear A, through the external gear A', through the meshing gears D and C, through the intermediate shaft 22 to the external gear E. This gear being in constant mesh with the internal gear H on the cylindrical member 61 causes the latter to be rotated in the same direction but at a reduced speed which is transmitted to the driven shaft 52 through the engagement of the teeth or projections I and J.

Tracing through the second speed the shifting lever 44 is held in its forward position and merely moved towards the right. It will be noted, therefore, that there is no change in the arrangement of the gears with respect to the drive end of the transmission, the only change being made in the driven end of the shifting lever 44 to the right. This movement causes the T-member 75 to be moved in the opposite direction and being connected to the pivoted lever 69 the shifting fork 64 is moved in a rearward direction along the driven shaft 52 until the external gear G slidably but non-rotatably mounted upon the driven shaft 52, meshes with the internal gear F on the cylindrical extension 27 of the intermediate shaft 22. In view of the fact that the external teeth or projections J of the sleeve 57 have been moved out of engagement with the internal teeth or projections I, the cylindrical member 61 is thus free to rotate through its engagement with the external gear E on the cylindrical extension 27 of the intermediate shaft 22. The drive is, therefore, through the drive shaft 13 to the external gear A in mesh with the external gear A, through the external gear D in mesh with the external gear C on the slidable sleeve 19, through the intermediate shaft 22 to the internal gear F on the cylindrical extension 27 and through the external gear G in mesh therewith to the driven shaft 52.

The third speed or first of the quiet high speeds is obtained by moving the shifting lever to the left and then rearwardly. Movement to the left causes the shifting fork 64 to be swung inwardly thus causing engagement between the internal teeth or projections I and the external teeth or projections J, while movement of the shifting lever rearwardly causes the shifting rod 30 to move forwardly thus sliding the sleeve 19 forwardly along the intermediate shaft 22 by means of the shifting fork 21 until the teeth of the clutch B engage with the extended portion of the teeth of the gear A. Thus the drive for the third speed or the first of the quiet high speeds is from the drive shaft 13 to the gear A, which being in mesh with the teeth of the clutch B rotates the intermediate shaft at substantially the same speed. The external gear E of the cylindrical extension 27 on the intermediate shaft 22 being in engagement with the internal gear H on the cylindrical member 61, which latter gear is of a larger diameter results in the latter gear being rotated at a materially reduced speed which is transmitted directly to the driven shaft 52 through the engagement of the teeth or projections I and J.

In the fourth speed or the second of the quiet high speeds, the shifting lever 44 is merely moved towards the right which movement results in moving the shifting fork 64 outwardly until the external gear G on the sleeve 56 is moved into meshing engagement with the internal gear F on the cylindrical extension 27 of the intermediate shaft 22. The drive, therefore, for the fourth gear or the second of the two quiet high speeds is from the drive shaft 13 through the external gear A which causes rotation of the intermediate shaft 22 by engagement between the teeth of the clutch B and the extended portions of the gear A, these two shafts being rotated in the same direction and at substantially the same speed, and thence from the intermediate shaft 22 through the internal gear F which is in mesh with the external gear G of reduced diameter, thus causing rotation of the driven shaft 22 at a much faster rate of speed than the drive shaft 13.

It is, therefore, evident that by the structure described I have obtained a four-speed transmission consisting of two quiet high speeds obtained by the employment of internal and external meshing gears. I am enabled to construct the unit in a very limited space occupying only slightly more space than the cutomary transmission due to the specific arrangement of the drive shaft and driven shaft, namely, the eccentricity between the axis of rotation of each of these shafts.

To shift the gear mechanism into reverse with the shifting lever in neutral position, the shifting lever 44 is moved to the left and would ordinarily stop in the neutral position between first and third speeds but due to the arrangement of the spring 74 and its associated mechanism the T-member 75 may be moved slightly beyond the neutral position between first and third speeds by exerting a slight pressure upon the shifting lever 44 towards the left. This permits the lower end 43 of the shifting lever 44 to be moved out of the recess 42 in the extension 41 and into the recess 50 on the extension 49 secured to the shifting rod 31. A forward movement of the shifting lever causes the shifting rod 31 to be moved rearwardly and inasmuch as the shifting fork 47 is connected to the shifting rod 31, the former is also moved rearwardly which results in shifting the external gear K over into engagement with the external gear D. The gear mechanism is thus reversed. The reverse drive is, therefore, from the drive shaft 13 through the external gear A, through the external gear A' to the gear D, through the external gear K, which being in mesh with the external gear C causes the latter to be rotated in the opposite direction and to the drive shaft 13. This causes the external gear E of the intermediate shaft 22 to be rotated in the opposite direction and being in mesh with the internal gear H reverse rotation is imparted to the driven shaft 52 through the engagement of the teeth of the clutch I and J.

It is to be understood, of course, that the transmission housings 10 and 51 are to be filled with lubricating oil so as to thoroughly lubricate the meshing gears and no difficulty has been found in supplying sufficient lubrication to the gears enclosed in the housing 10. To insure proper lubrication of the gears within the housing 51 a passageway 84 is provided in the lower portion of the auxiliary housing 51 which communicates with the oil chamber 85 in the housing 10. It is, however, rather difficult to lubricate the meshing gears F, G and E, and H and I have, therefore, provided in the wall joining the cylindrical extension 27 with the intermediate shaft 22 a plurality of apertures 86 which extend outwardly at an angle, as clearly shown in Fig. 1. Integrally with the outer face of the portion connecting the cylindrical extension 27 and the intermediate shaft 22 and adjacent the openings is a circumferentially extending tapered ridge or shoulder 87. It will, therefore, be understood that as the intermediate shaft 22 and cylindrical extension 27 are rapidly rotated in the lubricating oil contained in the transmission housing 10, the tendency will be to throw the oil outwardly due to centrifugal force and as the outwardly forced lubricating oil engages the tapered surface of the shoulder 87 it is fed through the openings 86 to within the cylindrical extension 27 and subsequently into engagement with the gears F and G and E and H.

While I have described the preferred construction of the transmission mechanism it is to be understood that I am not to be limited to this precise structure inasmuch as various changes and modifications may be made without departing from the the spirit of the invention as defined in the appended claims.

Having thus described my invention I claim:

1. In gearing of the character described, a rotatable drive shaft, a second rotatable shaft, means for directly connecting said second shaft for rotation at the same speed as said drive shaft, an internal gear rotatable with said second shaft and in the same direction, a driven shaft, the axis of rotation being permanently offset and parallel with respect to the axis of rotation of said drive shaft, and an external gear slidably and non-rotatably mounted on said driven shaft and adapted to mesh with said internal gear.

2. In gearing of the character described, a rotatable drive shaft, a second rotatable shaft extending concentrically with respect to the axis of said drive shaft, means slidably and non-rotatably mounted on said second shaft and adapted to directly connect the latter with said drive shaft, an external gear rotatable with said second shaft and in the same direction, a rotatable driven shaft, the axis of rotation being permanently offset and parallel with respect to the axis of rotation of said drive shaft, an internal gear rotatably supported concentrically of said driven shaft and in constant mesh with said external gear, a clutch member movable with said internal gear, and a clutch member slidably and non-rotatably supported on said driven shaft and adapted to be moved into meshing engagement with said first named clutch member.

3. In gearing of the character described, a rotatable drive shaft, a second rotatable shaft positioned concentrically with respect to the axis of rotation of said drive shaft, a member slidably and non-rotatably mounted upon said second shaft and adapted to connect the latter directly with said drive shaft, an internal gear and an external gear rotatable with said second shaft and in the same direction, a rotatable driven shaft, the axis of rotation being eccentric with respect to the axis of rotation of said drive shaft, a second internal gear rotatably supported concentrically of said driven shaft and in constant mesh with said external gear on said second shaft, a clutch member associated with said second internal gear, an external gear and a clutch member slidably and non-rotatably mounted on said driven shaft, and means for moving said external gear into meshing engagement with said internal gear on said second shaft, or for moving said clutch members into meshing engagement.

4. In gearing of the character described, a rotatable drive shaft, a second rotatable shaft having a portion journaled within said drive shaft and concentrically with respect to the axis thereof, means slidably and non-rotatably mounted on said second shaft and adapted to connect the latter for rotation directly with said drive shaft, means for anti-frictionally supporting the opposite end of said second shaft, an external gear and an internal gear rotatable with said second shaft and in the same direction, a rotatable driven shaft, the axis of rotation thereof being eccentric with respect to the axis of rotation of said second shaft, a second internal gear anti-frictionally supported concentrically with respect to the axis of said driven shaft, a clutch member associated with said second internal gear, a member slidably and non-rotatably mounted on said driven shaft, an external gear on said slidable member, a clutch member on said slidable member, and means for moving said member whereby said external gear thereon is brought into meshing engagement with said internal gear on said second shaft or said clutch member thereon brought into meshing engagement with said first named clutch member.

5. In gearing of the character described, a rotatable drive shaft, a second rotatable shaft supported concentrically with respect to the axis of said drive shaft, a member slidably and non-rotatably mounted on said second shaft and adapted to connect the latter directly with said drive shaft, an external gear and an internal gear rotatable with said second shaft and in the same direction, a rotatable driven shaft the axis of rotation thereof being eccentric with respect to the axis of rotation of said second shaft, a second internal gear rotatably supported concentrically with respect to the axis of said driven shaft, said internal gear being in constant mesh with said external gear on said second shaft and having a greater number of teeth, a clutch member associated with said second internal gear, a member slidably and non-rotatably mounted on said driven shaft, an external gear secured to said member and adapted to be moved into meshing engagement with said internal gear on said second shaft, said internal gear having a greater number of teeth than said external gear, a clutch member on said slidable member and adapted to be moved into meshing engagement with said first mentioned clutch member, and means for moving said slidable member.

6. In gearing of the character described, a housing enclosing a unit including a drive shaft rotatably supported therein, a second rotatable shaft supported concentrically with respect to the axis of said drive shaft, a member slidably and non-rotatably supported on said second shaft and adapted to connect the latter directly with said drive shaft, means for anti-frictionally supporting said second shaft in said casing, an external gear and an internal gear rotatable with said second shaft and in the same direction, an auxiliary housing adapted to be connected to said housing and enclosing a unit including a driven shaft rotatably supported in said auxiliary housing a second internal gear rotatably supported anti-frictionally in said auxiliary housing and concentrically with respect to the axis of rotation of said driven shaft, said second internal gear being in constant mesh with said external gear on said second shaft, a clutch member associated with said second internal gear, a member slidably and non-rotatably supported on said driven shaft, an external gear formed at one end of said slidable member and adapted to be moved into meshing engagement with said internal gear on said second shaft, a clutch member formed adjacent the opposite end of said slidable member and adapted to be moved into meshing engagement with said first mentioned clutch member, and means for moving said slidable members.

7. In gearing of the character described, a rotatable drive shaft, an external gear thereon rotatable in the same direction therewith, a pair of external gears rotatable in unison, one of said external gears being in constant mesh with said external gear on said drive shaft, a second rotatable shaft having a portion journaled within said drive shaft and concentrically with respect to the axis thereof, means for supporting the opposite end of said second shaft, a member slidably and non-rotatably supported on said second shaft, an internal clutch member on said slidable member adapted to be moved into meshing engagement with the external gear on said drive shaft to directly connect said shafts an external gear on said slidable member adapted to be moved into meshing engagement with the other of said pairs of external gears, an external gear and an internal gear rotatable with said second shaft and in the same direction, a rotatable driven shaft, the axis thereof being eccentric with respect to the axis of rotation of said second shaft, a second internal gear rotatably supported concentrically with respect to the axis of said driven shaft and in constant mesh with said external gear on said second shaft, a clutch member associated with said second internal gear, a member slidably and non-rotatably mounted on said driven shaft, an external gear carried by said slidable member and adapted to be moved into meshing engagement with said internal gear on said second shaft, a clutch member carried by said slidable member and adapted to be moved into meshing engagement with said first mentioned clutch member, and means for moving said slidable members conjointly to obtain the desired speed ratios between said drive shaft and said driven shaft.

In testimony whereof, I hereunto affix my signature.

JAMES P. JOHNSON.